United States Patent [19]
Ellis

[11] Patent Number: 5,576,046
[45] Date of Patent: Nov. 19, 1996

[54] METHOD OF TREATING FRESH FRUIT

[75] Inventor: Larry D. Ellis, St. Louis, Mo.

[73] Assignee: Tastemaker, Inc., Bridgeton, Mo.

[21] Appl. No.: 375,813

[22] Filed: Jan. 20, 1995

[51] Int. Cl.$^6$ ................................................. A23L 1/0524
[52] U.S. Cl. ........................... 426/615; 426/267; 426/310; 426/323; 426/326; 426/331; 426/616; 426/654
[58] Field of Search ................................. 426/615, 616, 426/267, 310, 323, 326, 331, 654

[56] References Cited

U.S. PATENT DOCUMENTS

| | | |
|---|---|---|
| 3,764,348 | 10/1973 | Huxsoll et al. ........................ 426/310 |
| 3,895,119 | 7/1975 | Grom . |
| 3,946,118 | 3/1976 | Sakal . |
| 4,117,172 | 9/1978 | Bradshaw et al. . |
| 4,194,016 | 3/1980 | Weaver et al. . |
| 4,353,930 | 10/1982 | Hirahara . |
| 4,504,504 | 3/1985 | Gaehring et al. . |
| 4,818,549 | 4/1989 | Steiner et al. . |
| 4,911,940 | 3/1990 | Steiner et al. . |
| 5,126,153 | 6/1992 | Beck . |
| 5,200,219 | 4/1993 | Twyman ................................ 426/310 |
| 5,332,589 | 7/1994 | Hinnergardt et al. ................. 426/615 |

OTHER PUBLICATIONS

Nelson et al. 1980. Fruit and Vegetable Juice Processing Technology, 3rd. Ed. Avi Publishing Co., Westport, Cn., p. 533.

Primary Examiner—Helen Pratt
Attorney, Agent, or Firm—Polster, Lieder, Woodruff & Lucchesi, L.C.

[57] ABSTRACT

A method of treating fresh fruit which gels the pectin in the fruit to keep the fruit's juice from separating from the fruit during subsequent processing. The method includes soaking the fruit in a calcium enriched solution for an extended period of time, i.e. from about 2 to about 6 weeks.

19 Claims, No Drawings

METHOD OF TREATING FRESH FRUIT

BACKGROUND OF THE APPLICATION

This invention relates to a method of treating fresh fruit, and in particular to a method of treating fresh fruit so that the fruit will maintain its fluids when canned as a shelf product.

When fresh fruit is picked and packed, it often is frozen until needed. However, when fresh fruit is frozen, the juice separates from the fruit when thawed, causing up to 50% loss in weight. The fruit juice can be separated or stabilized, but it cannot be placed back into the fruit itself. The fruit, without the juice as part of the fruit, shrinks and presents a less attractive, less desirable finished product. I do not know of any current method of treating fresh fruit before it is frozen which will enable the juice to stay in the fruit when the fruit is thawed.

Present methods of treating fresh fruit include adding sugars and stabilizers to the fruit prior to freezing. The stabilizers tend to thicken the juice when the fruit is thawed. The sugar is added to increase the solids content of the fruit. However, neither the sugar not the stabilizer will help keep the juice in the fruit; the juice will still separate from the fruit when it is thawed.

Fresh fruit is also pasteurized or sterilized when packed. This produces a good tasting product, but does not aid in keeping the juice in the fruit and the fruit looses its firmness.

SUMMARY OF THE INVENTION

One object of the present invention is to provide a method for treating fresh fruit prior to processing of the fruit to prevent separation of the juice from the fruit when the fruit is used.

Another object is to provide such a method which will produce fruit which will be firm.

Another object is to provide such a method which is easy to carry out.

Another object is to provide such a method which will not use a significant amount of energy.

These and other objects and advantages will become apparent to those skilled in the art in light of the following disclosure and accompanying drawings.

In accordance with the invention, generally stated, my method includes soaking fresh fruit, preferably after it has been washed and sliced or cubed, for an extended period of time in a calcium enriched aqueous solution to gel the pectin in the fruit. Preferably, the calcium solution also contains citric acid and preservatives. After the fruit has been soaked from about 2 to about 6 weeks (preferably for about 4 weeks), it is removed from the calcium solution and rinsed. After the fruit has been rinsed, coloring agents, sweeteners, stabilizers, flavorings, citric acid, and preservatives can be added to the fruit. The fruit also can be pasteurized and hot packed.

The solution includes water, calcium salt, citric acid, and preservatives, preferably sodium benzoate and potassium sorbate. The solution includes about 92% to about 98% water, about 1% to about 7% calcium, about 0.2% to about 0.3% citric acid, and about 0.4% to about 0.8% preservatives. Preferably, the solution is about 95% water, about. 4% calcium, about 0.2% citric acid, and about 0.64% preservatives.

DESCRIPTION OF THE PREFERRED EMBODIMENT

As noted above, conventional methods of treating fresh fruit prior to freezing or processing cause the juice to separate from the fruit when the frozen fruit is thawed. My method substantially prevents this problem. When fruit is treated in accordance with my method, the juice will not separate from the fruit when the fruit is processed.

My method consists of soaking the fruit in a calcium enriched solution having preservatives for an extended period of time, preferably about 2 to about 6 weeks. Most preferably, the fruit is soaked for about 4 weeks in the solution. The calcium enriched solution includes water, a calcium salt, citric acid, and preservatives, preferably sodium benzoate and potassium sorbate. Although any form of calcium may be used in my solution, calcium chloride is preferred. When the fruit is soaked in my solution, the pectin in the fruit reacts with the calcium so that the pectin in the fruit is gelled. With the pectin gelled in the fruit, the fruit may be frozen, and upon thawing, the juice will remain in the fruit. The calcium treated fruit also can be hot packed or otherwise processed without losing its juice.

Preferably, the freshly picked fruit is washed, sorted, and sliced, cubed or chopped prior to being placed in the bath.

When a 100 lb. fruit/solution mixture is used, the mixture includes, by weight, 60–75 lbs. fresh fruit, 25–40 lbs. water, 0.5–3 lbs. calcium salt, 0.05–0.2 lbs. citric acid, 0.05–0.1 lbs. sodium benzoate, and 0.05–0.1 lbs. potassium sorbate. Preferably, 68.75 lbs. of fresh fruit is soaked in 29.7375 lbs. water, 1.25 lbs. calcium salt, 0.0625 lbs. citric acid, 0.1 lbs. sodium benzoate, and 0.1 lbs. potassium sorbate.

By weight, the solution, itself, is about 92% to 98% water, about 1 to 7% calcium salt, about 0.2% to 0.3% citric acid, about 0.4% to 0.8% preservatives. The preservatives preferably are about 0.2% to 0.4% sodium benzoate and about 0.2% to 0.4% potassium sorbate, by weight of the solution. The preferred solution is about 95.16% water, about 4% calcium salt, about 0.2% citric acid, about 0.32% sodium benzoate, and about 0.32% potassium sorbate.

When the fruit has soaked in the bath sufficiently long, about 2 to 6 weeks, and preferably about 4 weeks, the fruit is removed from the solution and rinsed. With appropriate changes to the solution, the fruit can be stored indefinitely in the solution. After the fruit has been rinsed, coloring agents, sweeteners, stabilizers, flavorings, citric acid, and other preservatives may be added. The treated fruit is then pasteurized and hot packed. The finished product is shelf stable and ready for direct addition to dairy or bakery products.

Any suitable fresh fruit can be processed by this invention, including strawberries, peaches, raspberries, etc.

Suitable calcium salts include calcium chloride, calcium oxide, calcium carbonate, calcium phosphate, calcium lactate, etc.

The various additives may be added in any combination desired. For example, placing the soaked fruit in a sweetener syrup increases the solids content of the fruit which gives the fruit a better texture in ice cream.

My method has several benefits over the prior method. When most fruit is picked and packed, it is frozen. When frozen fruit is thawed, most of the liquid separates from the fruit causing up to 50% loss of weight. The fruit then shrinks and makes a less attractive finished product. When the fruit is stored in my solution, the calcium causes the pectin to gel, making the fruit firm. Since the pectin is gelled in the fruit, the juice does not tend to separate from the fruit during processing. Hence, there is little to no loss of weight and little to no shrinking of the fruit. The extra firmness of the fruit produces a better finished product after going through processing equipment. The product will stay firm, allowing one to make a hot pack shelf stable product with better fruit identity. Because my method does not include freezing and storing of the fruit frozen, less energy is consumed by my method. When the fruit is soaked in a sweetener solution, the solids content of the fruit will increase, making the fruit firmer. This will make the fruit a superior ice cream fruit.

My method of treating fresh fruit provides a finished product which gels the pectin in the fruit and retains the juices in the fruit upon thawing of the fruit. My method does not rely on freezing of the fruit and storing the fruit frozen. It thus uses less energy then current methods.

EXAMPLE 1

Fresh strawberries are picked, washed, and sorted. In carrying out my method, 250 lbs. of strawberries were placed in 55 gallon drums. A solution of 6 lbs of calcium chloride, 0.45 lb. of citric acid, 0.2 lb. or sodium benzoate, 0.2 lb. potassium sorbate, and 143 lbs. of water was added to the strawberries. The fruit is stored for two weeks to one year at refrigerated or room temperature (about 68° F.). When needed, the fruit can be rinsed and used, or further processed as in the same manner as frozen fruit. The fruit, after being soaked in the solution, is firmer than fresh fruit.

EXAMPLE 2

Fresh peaches are picked, washed and sorted. The peaches can be sliced, shopped or cubed. 250 lbs of peaches are placed in 55 gallon drums. The solution of Example 1 is used to cover the peaches. The peaches can be soaked and stored in the solution for two weeks to one year at refrigerated or room temperatures, and without freezing the fruit. The fruit can be rinsed and used in the same manner as frozen fruit. Further, the peaches are firmer than fresh peaches after having been soaked in the solution.

EXAMPLE 3

Fresh raspberries were picked, washed and sorted, They were treated in the same manner as the peaches and the strawberries.

As variations within the scope of the appended claims may be apparent to those skilled in the art, the foregoing description is set forth only for illustrative purposes and is not meant to be limiting.

I claim:

1. A method for treating and storing fresh fruit comprising the steps of soaking the fruit in a calcium-enriched aqueouss solution containing an amount of calcium salt sufficient to gel the fruit, holding the fruit in the calcium-enriched solution for a period of time of at leat about two weeks sufficient to gel pectin in the fruit, rinsing said fruit after said fruit is removed from said solution, and recovering a fruit having substantially the firmness and juice content of the fresh fruit.

2. The method of claim 1 wherein said soaking and storing step is carried out for from about 2 weeks to about 1 year.

3. The method of claim 3 wherein said soaking step lasts for about 4 weeks.

4. The method of claim 1 wherein said solution contains about 1% to about 7% calcium salt.

5. The method of claim 4 wherein said solution further includes water, citric acid, and preservatives.

6. The method of claim 5 wherein said preservatives are chosen from a group consisting of sodium benzoate, potassium sorbate, and combinations thereof.

7. The method of claim 5 wherein said solution is about 4% calcium salt.

8. The method of claim 5 wherein said solution includes about 92% to about 98% water, 0.2% to about 0.3% citric acid, and about 0.4% to about 0.8% preservatives.

9. The method of claim 5 wherein said solution includes about 4% calcium, about 95% water, about 0.2% citric acid, and about 0.64% preservatives.

10. The method of claim 2 including adding one or more of coloring agents, sweeteners, stabilizers, flavorings, citric acid, and preservatives to the fruit after said rinsing step.

11. The method of claim 2 including pasteurizing said fruit after said rinsing step.

12. A method of making processed fruit comprising
   (a) adding fresh washed fruit to an aqueous brine solution of calcium salt;
   (b) holding the fruit in the brine solution for about 2 weeks to about 6 weeks to gel the pectin in the fruit;
   (c) separating the fruit from the brine solution; and
   (d) recovering a fruit which retains substantially all of its juices intact.

13. The method of claim 12 wherein the mixture of fruit and brine solution contains, on a weight basis, about 60% to about 75% fruit, about 25% to about 40% water, about 0.5% to about 3% calcium salt, and about 0.1% to about 0.4% preservatives.

14. The method of claim 13 including about 0.05% to about 0.2% citric acid.

15. The method of claim 13 including among the preservatives, about 0.05% to about 0.10% sodium benzoate and about 0.05% to about 0.10% potassium sorbate.

16. The method of claim 12 wherein the calcium salt is calcium chloride.

17. The method of claim 12 including the steps of
   (e) washing the recovered fruit to remove the brine;
   (f) adding preservatives to the washed fruit; and
   (g) hot packing the fruit and preservatives.

18. The method of claim 17 including the step of soaking the washed fruit in a sweetener solution to increase the solids before packing.

19. The method of claim 17 including a step of pasteurizing the fruit before packing.

* * * * *